United States Patent [19]
Bonyhard

[11] Patent Number: 5,991,104
[45] Date of Patent: Nov. 23, 1999

[54] USING SERVOWRITER MEDIUM FOR QUICKLY WRITTEN SERVO-PATTERNS ON MAGNETIC MEDIA

[75] Inventor: Peter I. Bonyhard, Scotts Valley, Calif.

[73] Assignee: Seagate Technology, Inc., Scotts Valley, Calif.

[21] Appl. No.: 08/757,908

[22] Filed: Nov. 27, 1996

[51] Int. Cl.⁶ .................. G11B 5/86; G11B 5/02
[52] U.S. Cl. ................. 360/15; 360/55
[58] Field of Search ................. 360/51, 77.08, 360/135, 16, 17, 97.02, 97.03, 15, 55; 428/156

[56] References Cited

U.S. PATENT DOCUMENTS

| | | |
|---|---|---|
| 3,258,750 | 6/1966 | Shew . |
| 3,593,331 | 7/1971 | Connell et al. ............... 760/135 |
| 3,753,252 | 8/1973 | Tietze ............................ 360/135 |
| 3,777,075 | 12/1973 | Hendershot et al. ........... 360/17 |
| 3,844,907 | 10/1974 | Kitamoto et al. ............. 360/17 |
| 4,783,705 | 11/1988 | Moon et al. ................... 360/77.08 |
| 4,802,050 | 1/1989 | Miyabayashi et al. ........ 360/135 |
| 5,193,034 | 3/1993 | Tsuyoshi et al. .............. 360/51 |
| 5,210,672 | 5/1993 | Ivers et al. ..................... 360/135 |
| 5,278,703 | 1/1994 | Rub et al. ....................... 360/51 |
| 5,350,618 | 9/1994 | Togawa et al. ................ 428/156 |
| 5,523,897 | 6/1996 | Nelson et al. .................. 360/16 |

Primary Examiner—W. Chris Kim
Attorney, Agent, or Firm—Kinney & Lange, P.A.

[57] ABSTRACT

Servo-pattern information is magnetically recorded on a product disc by magnetic print-through from a master medium. The master servo-writing medium is brought into close proximity with the product "slave" disc, and the two are subjected to an external magnetic field which assists in transferring magnetic servo-patterns to the slave disc in a print-through process. The preferred external magnetic field alternates and rotates with respect to the master/slave combination. In an alternative product disc structure, the magnetic layer is magnetically altered in a servo-pattern configuration. Non-magnetic portions of the servo pattern are created which define both gray code and servo burst information for the product disc.

30 Claims, 11 Drawing Sheets

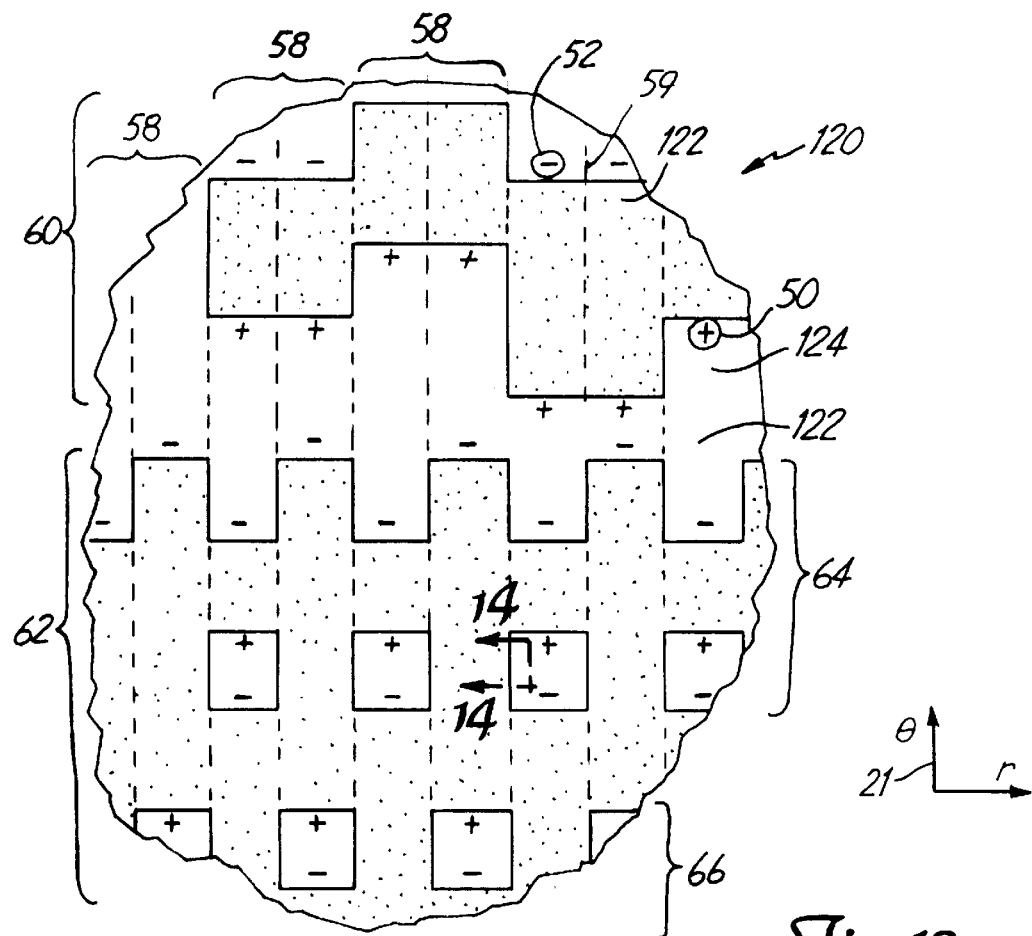
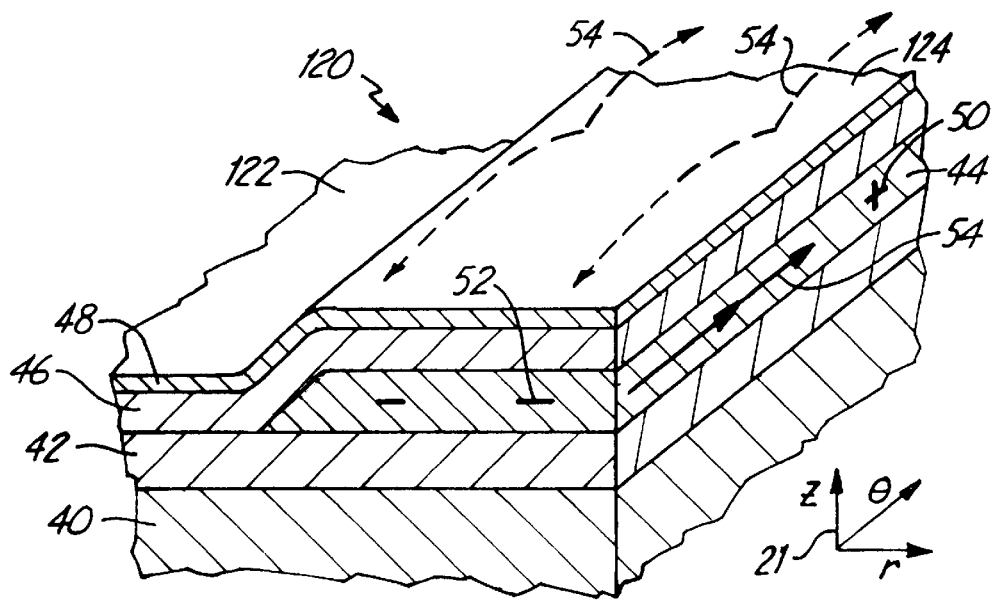

USING SERVOWRITER MEDIUM FOR QUICKLY WRITTEN SERVO-PATTERNS ON MAGNETIC MEDIA

BACKGROUND OF THE INVENTION

The present invention relates generally to magnetic media for recording information, and, more particularly, to disc drives with magnetic head assemblies which record information in tracks on thin film discs.

The computer industry continually seeks to reduce size of computer components and to increase the speed at which computer components operate. To this end, it is desired to reduce the size required to magnetically record bits of information. It is concomitantly important to maintain the integrity of the information as size is decreased, and magnetic storage of information must be virtually 100% error free. Moreover, the methods used to reduce size, increase speed and maintain information integrity in computer components must be very reproducible in a manufacturing setting and must not be overly costly. The present invention seeks to address these goals in a disc drive.

Disc drives which magnetically record, store and retrieve information on disc-shaped media are widely used in the computer industry. A write transducer is used to record information on the disc, and a read transducer is used to retrieve information from the disc. The reading and writing processes may be performed by a single structure, i.e., a read-write transducer, or alternatively may be performed by separate structures. In either case, the read transducer and the write transducer are generally both located on a single magnetic head assembly. The magnetic head assembly may include an air bearing slider which suspends the magnetic head assembly relative to the rotating disc by "flying" off air on the disc surface.

The magnetic head assembly is mounted on the end of a support or actuator arm, which positions the head radially on the disc surface. If the actuator arm is held stationary, the magnetic head assembly will pass over a circular path on the disc known as a track, and information can be read from or written to that track. Each concentric track has a unique radius, and reading and writing information from or to a specific track requires the magnetic head to be located above the track. By moving the actuator arm, the magnetic head assembly is moved radially on the disc surface between tracks.

The disc drive must be able to differentiate between tracks on the disc and to center the magnetic head over any particular track. Most disc drives use embedded "servo patterns" of magnetically recorded information on the disc. The servo patterns are read by the magnetic head assembly to inform the disc drive of track location. Tracks typically include both data sectors and servo patterns. Each data sector contains a header followed by a data section. The header may include synchronization information to synchronize various timers in the disc drive to the speed of disc rotation, while the data section is used for recording data.

Each servo pattern typically includes a "gray code" and a "servo burst". The gray code indexes the radial position of the track such as through a track number, and may also provide a circumferential index such as a sector number. The servo burst is a centering pattern to precisely position the head over the center of the track. Each servo burst includes magnetic transitions on the inside of the track interleaved with magnetic transitions on the outside of the track. If the magnetic head is centered over the track, the signal read from the inside transitions will be equal and opposite to the signal read from the outside transitions. If the magnetic head is toward the inside of the track, the signal from the inside transitions will predominate, and vice versa. By comparing portions of the servo burst signal, the disc drive can iteratively adjust the head location until a zeroed position error signal is returned from the servo bursts indicating that the head is properly centered with respect to the track.

Servo patterns are usually written on the disc during manufacture of the disc drive, after the drive is assembled and operational. In contrast to data sections, servo patterns are written only once and are not written over by the magnetic head during use of the drive. The servo pattern information, and particularly the track spacing and centering information, needs to be located very precisely on the disc. However, at the time the servo patterns are written, there are no reference locations on the disc surface which can be perceived by the disc drive. Accordingly, a highly specialized device known as a "servo-writer" is used during writing of the servo-patterns. Largely because of the locational precision needed, servo-writers are fairly expensive, and servo-writing is a time consuming process.

Most servo-writers operate using the disc drive's own magnetic head. The servo-writer takes precise positional references to properly position the heads in the disc drive for the writing of the servo patterns, and to properly space the tracks with respect to one another on the disc surface. For instance, the servo writer may have a physical position sensor which takes a positional reference from the axis of the drive spindle, and may have an optical position sensor which determines the location of the magnetic heads with respect to the axis of the drive spindle. With precise positioning of the magnetic head known, the magnetic head of the disc drive is used to write the servo pattern on the disc. The servo writer may also include a magnetic head which writes a clock track at an outer radius of the disc. Once written, servo patterns serve as the positional references on the disc surface used by the disc drive during the entire life of the disc drive. The servo patterns are used to properly center the head over the desired track prior to reading or writing any data information from or to that track.

One approach to avoid traditional servo-writing has been to injection mold or stamp servo patterns on a plastic substrate disc. The magnetic material layer is then applied at a consistent thickness over the entire disc surface, including the depressions and protrusions in the servo patterns. After the disc is mechanically fabricated (i.e., after all the layers are applied), a magnetic bias is recorded on the servo patterns. For instance, a first magnetic field may magnetically initialize the entire disc at a one setting. Then a second magnetic field, localized at the surface of the disc and perhaps provided by the magnetic head of the drive, is used to magnetize the protruding portions of the servo patterns relative to the depressions. Because the protrusions are closer than the depressions to the magnetic initialization, the magnetization carried by the protrusions may be different than the magnetization carried by the depressions. When read, the resulting disc servo patterns show magnetic transitions between the depressions and the protrusions. This approach, referred to as a PERM disc, is being pursued by the Sony Corp.

While servo patterns in PERM discs do not require much of the specialized servo-writing equipment otherwise necessary, other problems have arisen. The depressions in the disc surface have a detrimental effect on the flyability of the air bearing slider. Additionally, in traditional servo-patterns, the magnitude of the position error signal from the servo pattern is based on transitions from magnetism in one direction to magnetism in the opposite direction. Because the depressions in the PERM servo patterns make no significant contribution of the output signal, the resultant position error signal of the servo patterns is half that of a traditional servo pattern. In practice, perhaps due to imperfect saturation of the magnetic medium in the depressions, the resultant position error signal of PERM servo patterns has an even lower signal to noise ratio, typically around one-third that of the traditional servo signal. Other methods to reduce the cost of servo-writing without the drawbacks of the PERM disc are desired.

SUMMARY OF THE INVENTION

The present invention is a method and structure to create servo-patterns on magnetic discs without the use of servowriters. In one embodiment, a master servo-writing medium is brought into close proximity with the product "slave" disc, and the two are subjected to an external magnetic field which assists in transferring magnetic servo-patterns to the slave disc in a print-through process. The preferred external magnetic field alternates and rotates with respect to the master/slave combination. With a demagnetized product/slave disc, an assist field strength which is of a magnitude greater than the coercivity of the slave disc but lower than the coercivity of the master media can be used to transfer a magnetic servo-pattern onto the slave disc. In a different embodiment, any of several methods can be used to magnetically alter the magnetic layer in a servo-pattern configuration. For instance, portions of the magnetic layer may be photolithographically removed to leave only the signal generating portions of the servo-patterns. Alternative to removal of portions of the magnetic layer, those portions may have their crystal structure altered to render them non-magnetic, thus similarly leaving only the signal generating portions of the servo-patterns intact.

BRIEF DESCRIPTION OF THE DRAWINGS

FIG. 13 is a greatly enlarged top plan view of the magnetic medium of another alternative embodiment of the present invention, schematically showing magnetic flux.

FIG. 14 is a cross-sectional view of a portion the magnetic medium of either of FIGS. 12 or 13, taken along line 14—14.

While the above-identified drawing figures set forth preferred embodiments, other embodiments of the present invention are also contemplated, some of which are noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
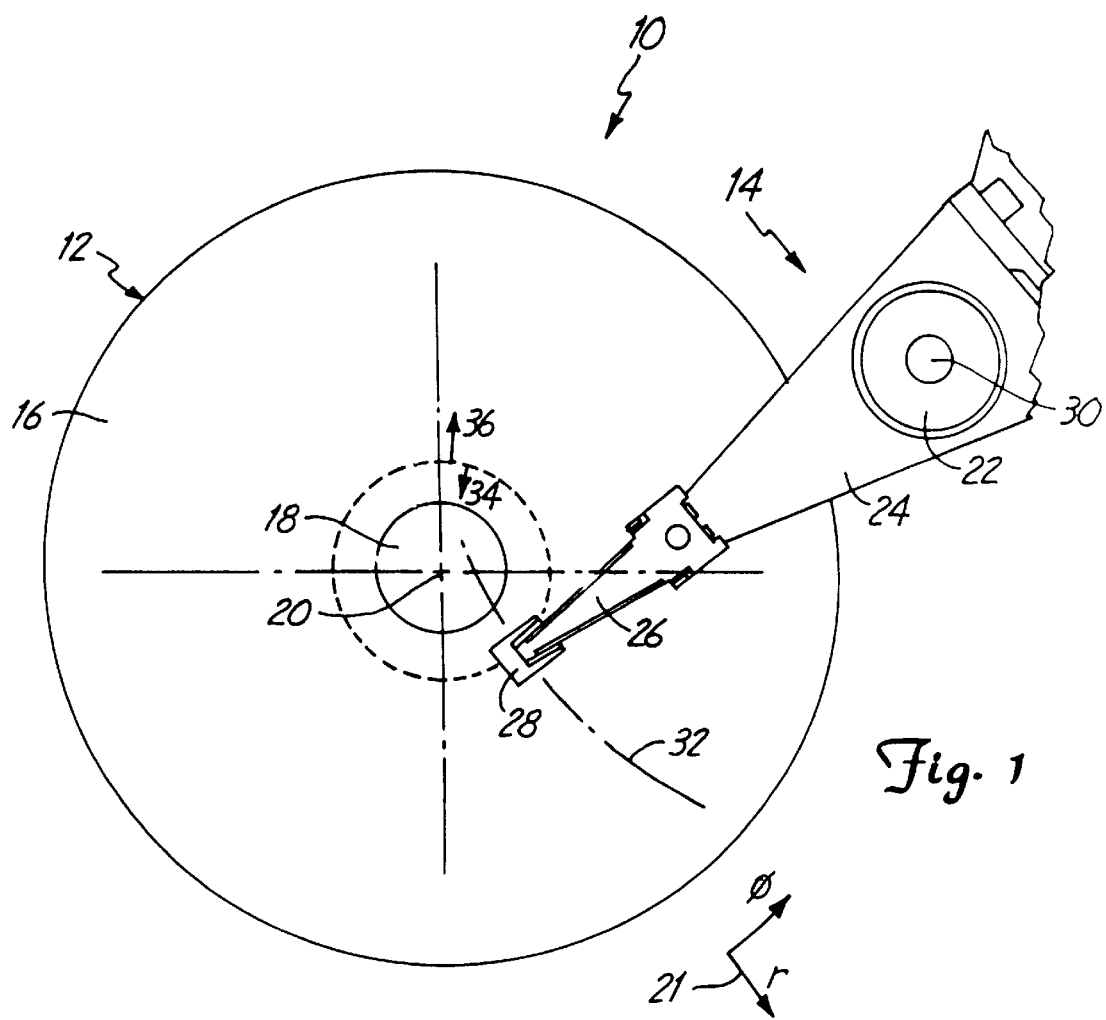
FIG. 1 is a top plan view of a computer disc drive.
Figure 2:
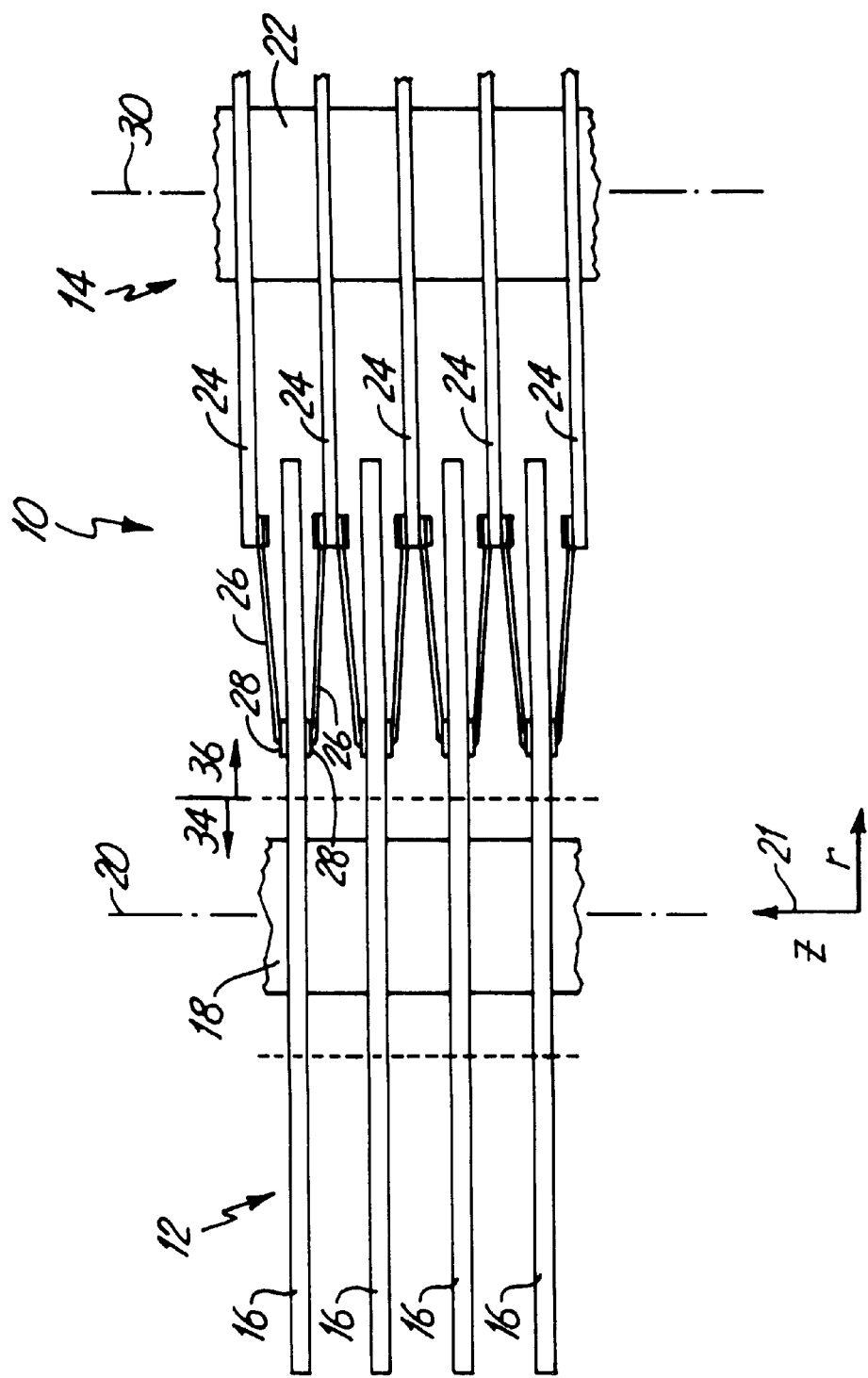
FIG. 2 is a side view of the computer disc drive of FIG. 1.

FIGS. 1 and 2 represent a disc drive structure 10. Disc drive assembly 10 includes disc pack 12 and E-block assembly 14. Disc pack 12 includes discs 16 stacked on drive spindle 18. During use of the disc drive 10, drive spindle 18 rotates discs 16 about axis 20. Polar coordinates 21 are established based on the geometry of disc 16, with the perpendicular distance from axis 20 to any location on disc 16 being a radius r, the circumferential dimension being $\Theta$, and the axial dimension being z.

E-block assembly 14 includes servo spindle 22 and a plurality of actuator arms 24. Each actuator arm 24 carries one or two flexure arms or suspension arms 26. Each suspension arm 26 supports an air bearing magnetic head assembly 28 adjacent a surface of a disc 16. As disc 16 rotates about drive spindle 18 at a high speed (such as 10 m/s or higher) relative to magnetic head assembly 28, the aerodynamic properties of magnetic head assembly 28 cause assembly 28 to "fly" above the surface of disc 16. The flying height of magnetic head assembly 28 above disc 16 is a function of the speed of rotation of disc 16, the aerodynamic lift of the slider of magnetic head assembly 28, and the spring tension in suspension arm 26.

E-block assembly 14 is pivotable about pivot axis 30. As E-block assembly 14 pivots, each magnetic head assembly 28 mounted at the tip of its suspension arm 26 swings through arc 32. As each disc 16 rotates beneath its respective magnetic head assembly 28, this pivoting motion allows the magnetic head assembly 28 to change track positions on its disc 16. Each disc 16 has a landing zone 34 where the magnetic head assembly 28 lands, rests while the disc drive 10 is off, and takes off from when the disc drive 10 is started up. Each disc 16 has a data zone 36 where the magnetic head assembly 28 flies over the disc 16 and magnetically stores data.

To record information on the disc 16, the write transducer on magnetic head assembly 28 creates a highly concentrated magnetic field. During writing, the strength of the concentrated magnetic field directly under the write transducer is greater than the coercivity of the recording medium (known as "saturating" the medium), and grains of the recording medium at that location are magnetized with a direction which matches the direction of the applied magnetic field. The grains of the recording medium retain their magnetization after the saturating magnetic field is removed. As the disc 16 rotates, the direction of the writing magnetic field is alternated based on bits of the information being stored, thereby recording a magnetic pattern on the track directly under the write transducer.

Figure 3:
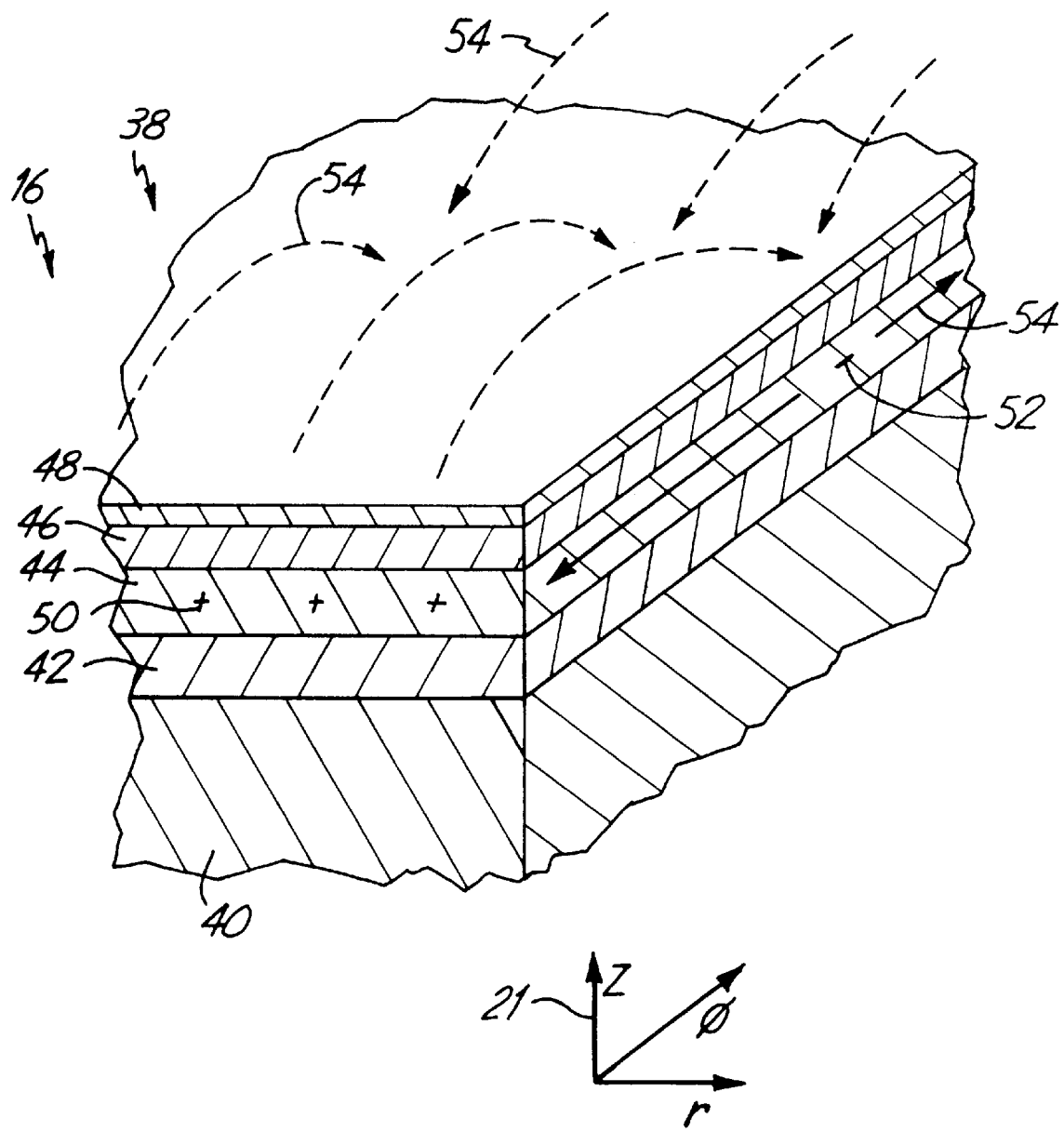
FIG. 3 is a greatly enlarged, cross-sectional perspective view of a portion of the thin film magnetic disc of FIG. 1, schematically showing magnetic flux.

A magnetic medium 38 for disc 16 is illustrated in more detail in FIG. 3. Magnetic medium 38 has a substrate 40 and an underlayer 42 deposited over the substrate 40. Substrate 40 is preferably a nickel-phosphorus plated aluminum disc. Substrate 40 is relatively thick, such as about 0.1 inches, and provides the structural integrity for magnetic medium 38. Other materials, such as glass or manganese-oxide, may also be suitable for substrate 40.

Underlayer 42 is formed of a non-magnetic material, such as chromium or nickel-aluminum. Underlayer 44 is preferably 200 to 500 Angstroms thick. Underlayer 42 sets up a seeding crystallographic structure for proper crystal development in magnetic layer 44. Underlayer 42 may be applied over substrate 40 by sputtering, and various sputter chamber parameters may contribute to the effectiveness of underlayer 42. Other materials such as Mo, W, Ti, NiP, CrV and Cr alloyed with other substitutional elements have also been tried for underlayers, and workers skilled in the art will appreciate that any one of these types of underlayers may be found equivalently beneficial in applying the process of the present invention.

Magnetic layer 44 of a magnetic material is applied over underlayer 42. Magnetic layer 44 is preferably formed of a cobalt-based alloy, such as a cobalt-chromium-tantalum alloy. The preferred cobalt-based magnetic layer 44 has a hexagonal close pack (HCP) crystal structure. Workers skilled in the art will appreciate that other types of magnetic layers may be eqhivalently used in practicing the present invention.

Magnetic layer 44 is preferably 100 to 300 Angstroms thick. Magnetic layer 44 may be applied over underlayer 42 by sputtering, and various sputter chamber parameters may contribute to the effectiveness of magnetic layer 18.

To enhance the durability of the disc 16, overcoat 46 is deposited over magnetic layer 44. Overcoat 46 helps reduce wear of magnetic media 36 due to contact with the magnetic read-write head assembly 28. Overcoat 46 also aids in corrosion resistance for the magnetic media 38. Overcoat 46 preferably is a layer of sputtered amorphous carbon. Other materials which may be suitable for overcoat 46 include sputtered ceramic zirconium oxide and amorphous films of silicon dioxide. Overcoat 46 can be about 100 to 150 Angstroms thick, with a preferred thickness of about 120 Angstroms. Any of the substrate 40, the underlayer 42 or the overcoat 46 may be textured as desired for beneficially affecting the tribology of the particular disc drive system 10.

A lubricant layer 48 overlies overcoat 46. Lubricant layer 48 also reduces wear and corrosion of the magnetic media 38. The lubricant 48 is preferably a perfluoropolyether-based (PFPE) lubricant having a thickness of 10 to 20 Angstroms. Overcoat 46 and lubricant 48, while not performing a magnetic function, greatly affect the tribology and wear and corrosion resistance in the disc drive system 10.

Magnetic layer 44, as originally deposited, is homogeneous in both the radial and circumferential directions, and carries no magnetic charge. After deposition of magnetic layer 44, information is magnetically written on magnetic layer 44 as represented by + and −magnetization signs 50, 52. In FIG. 3, multiple + and −magnetization signs 50, 52 and multiple magnetic flux arrows 54 are shown to indicate the direction of aligned magnetic domains and to indicate that numerous aligned domains contribute to each magnetic transition. The writing of the magnetic information occurs after disc 16 is fully fabricated including deposition of overcoat 46 and lubricant 48. The magnetization is believed to be made up of numerous aligned magnetic domains in the structure of magnetic layer 44. Data is then read from magnetic medium 38 by sensing the alternating direction of magnetization, that is, transition locations where the direction of aligned magnetic domains reverses.

Figure 4:
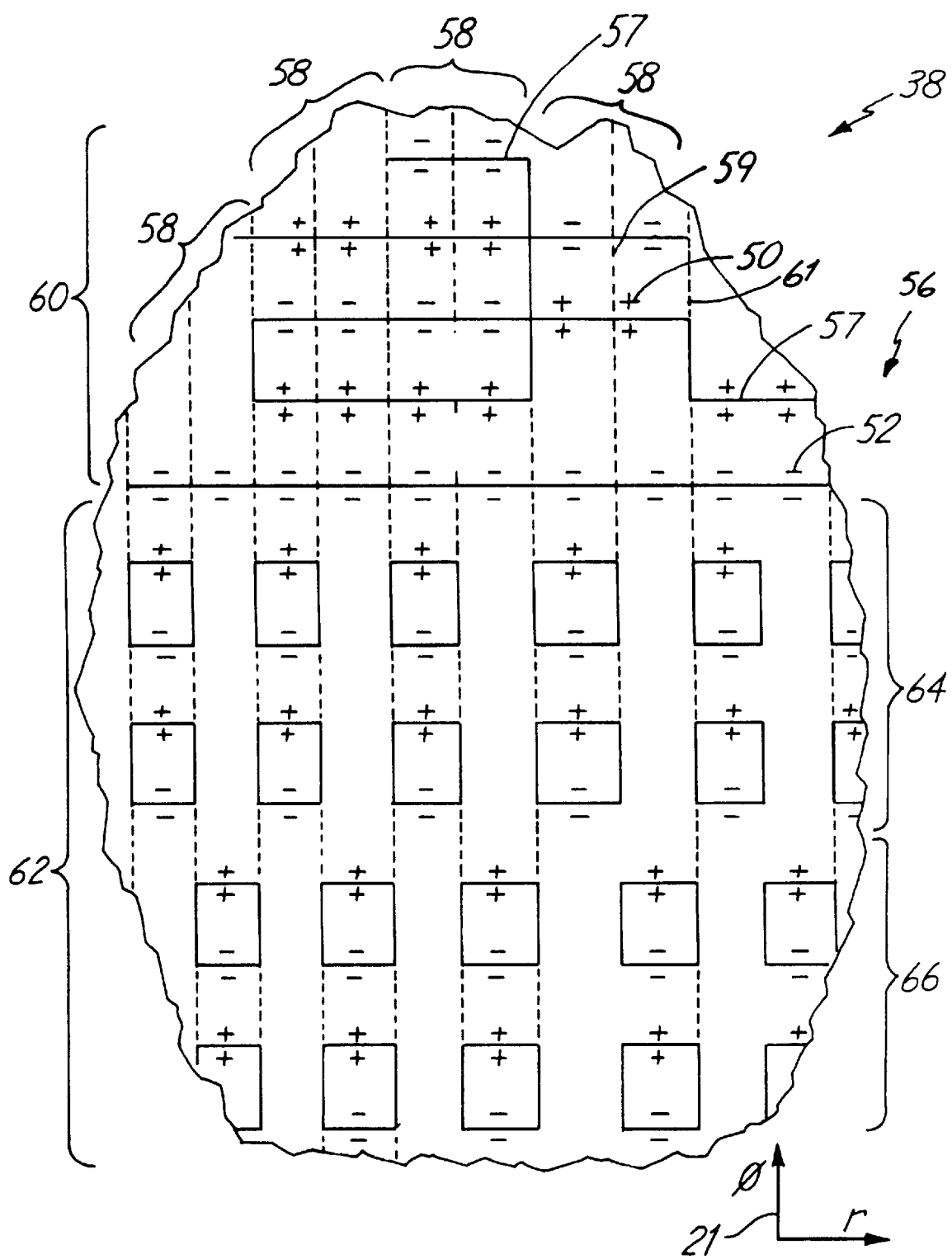
FIG. 4 is a greatly enlarged top plan view of a servo pattern portion of the thin film magnetic disc of FIG. 1, schematically showing magnetic flux.

FIG. 4 schematically shows an a real portion of servo-pattern information 56 magnetically recorded on disc 16. Magnetization signs 50, 52 indicate the direction of magnetization from the aligned magnetic domains. In FIG. 4, transition boundaries 57 between areas of opposite magnetic domain alignment are shown in solid lines. The boundaries 61 of each track 58 are shown in small dashed lines, and a center line 59 of each track 58 is shown in larger dashed lines. The boundaries 61 of each track 58 and the center lines 59 are not recognizable by any physical properties of the magnetic medium 38, but are shown for conceptual purposes only. During use of the disc drive 10, the magnetic head assembly 28 is intended to be centered over a track 58 so the magnetic head assembly will accurately write information to and read information from that track 58. In contrast to track boundaries 61 and center lines 59, each transition boundary 57 is magnetically sensed by the magnetic head assembly 28 when it passes over the transition boundary 57.

In the servo-patterns 56, substantially all of the magnetic domains in magnetic medium 38 are aligned in one direction or the other. While transition boundaries 57 are shown in FIG. 4 as sharply defined areas, the true magnetic pattern may not have sharp transitions between opposite directions of magnetization. The sharpness of the transition boundaries on a recording medium is one of the basic parameters in determining the density of the information which can be stored on the recording medium.

Servo pattern information 56 is magnetically written on magnetic medium 38 during manufacture of the disc drive 10. Each servo pattern includes gray code information 60 and a servo burst 62. Gray code information 60 contains indexing information to index each track 58 of the disc 16. Each servo burst 62 includes a plurality of inside transitions 64. Each servo burst 62 also includes a plurality of outside transitions 66. Inside transitions 64 and outside transitions 66 are precisely located on the disc 16 in the radial direction to define the centerline 59 of each track 58, and to maintain very consistent spacing between tracks 58.

During use of the disc drive 10, inside transitions 64 and outside transitions 66 are used to center the magnetic head 28 over a track 58. The signal read from servo bursts 62 depends on the radial position of the magnetic head 28 with respect to the centerline 59 of a track 58. If the magnetic head 28 is centered over the track 58, the signal read from the inside transitions 64 will be equal to the signal read from the outside transitions 66. If the magnetic head 28 is toward the inside of the track 58, the signal from the inside transitions 64 will be stronger than the signal from the outside transitions 66. If the magnetic head 28 is toward the outside of the track 58, the signal from the outside transitions 66 will be stronger. By comparing portions of the servo burst 62 signal, the disc drive 10 can iteratively adjust the head 28 location until a zeroed position error signal is returned from the servo bursts 62, indicating that the head 28 is properly centered with respect to the track 58.

Traditionally, the servo patterns 56 are written on the magnetic medium 38 during manufacture with a servo writer. Writing of the magnetic signals requires two precisely positioned passes of the magnetic head 28 over each track 58: one for the inside transitions 64 and one for the outside transitions 66. The magnetic head 28 typically writes a signal which is around one track-width wide, considerably wider than either the inside transitions 64 or the outside transitions 66. The only way the servo bursts 62 can be written with such a head 28 is by erasing on each pass part of what was written in the previous pass. The track-centered gray code information 60 is written by matching the magnetization direction during consecutive passes of the magnetic head 28. This process of matching the magnetization of a previous pass to create a recorded magnetic transition which is wider than the width of the recording head is referred to as "stitching".

Figure 4A:
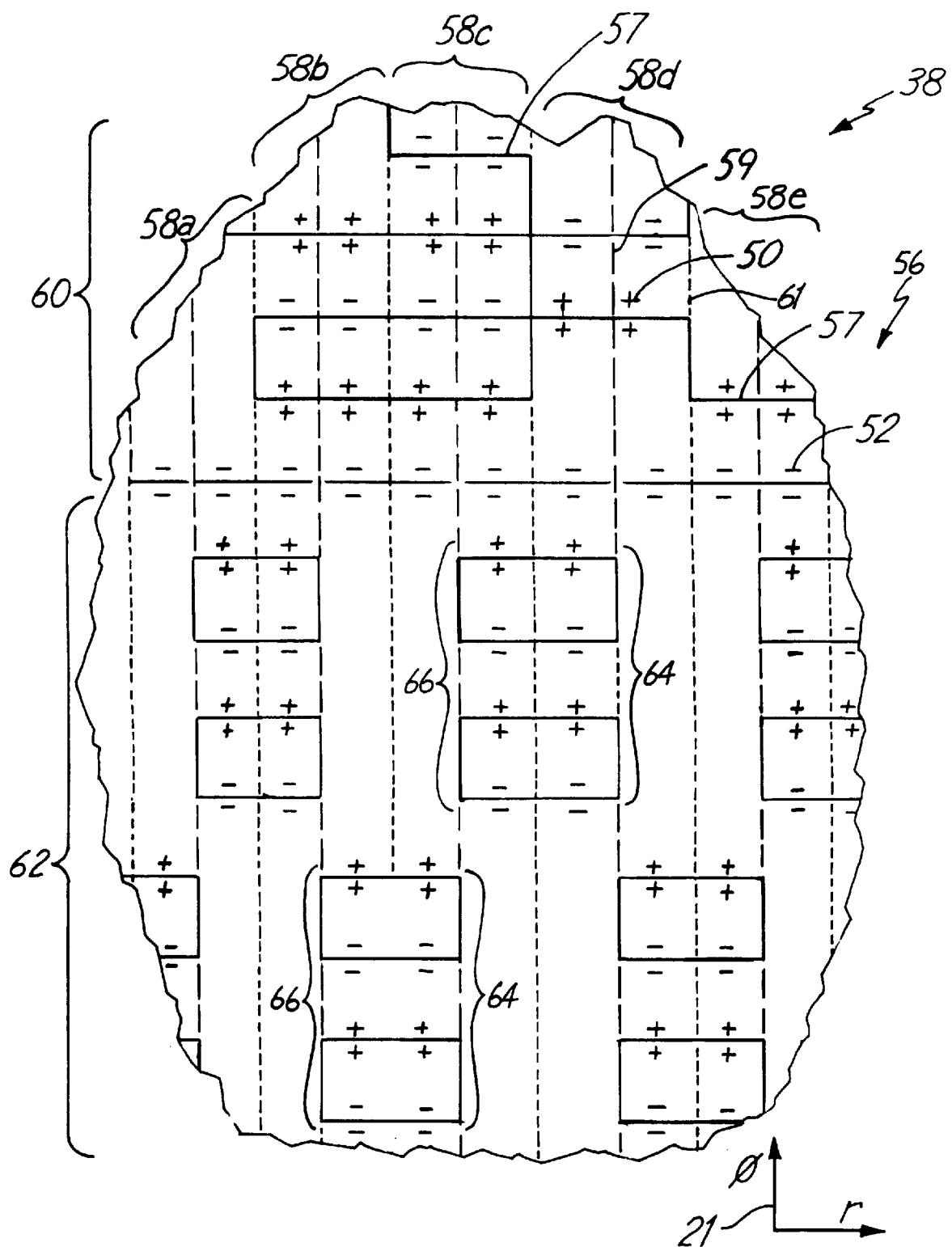
FIG. 4a is a greatly enlarged top plan view of an alternative servo pattern portion of the thin film magnetic disc.

FIG. 4a shows an alternative configuration for servo bursts 62. This configuration is quite similar to the configuration of FIG. 4, but the inside transitions 64 are reversed with the outside transitions 66 in every other track 58a, 58c, 58e. This servo burst configuration of FIG. 4a produces the strongest position error signal when the head is at a track boundary 61. The position error signal decreases monotonically as the head 28 approaches the center line 59, and becomes zeroed out when the head 28 is centered over the center line 59. Writing of the magnetic signals shown in FIG. 4a still requires two precisely positioned passes of the magnetic head 28 over each track 58: one for the inside transitions 64 and one for the outside transitions 66. The servo burst configuration of FIG. 4a may be preferable to the servo burst configuration of FIG. 4 due to the resultant position error signal. Workers skilled in the art will appreciate that either configuration of FIG. 4 or FIG. 4a may work suitably.

The present invention relates to a better method of writing the servo pattern information, both less expensive and faster. In a first embodiment of the present invention, the servo patterns are written from a master disc 70 (shown in FIGS. 7 and 8) to a product "slave" disc 16 by magnetic proximity printing, or magnetic print-through. One master disc 70 is used to print consecutively onto a very large number of product discs 16. The master disc 70 has a servo master pattern written thereon, and the magnetic field from the servo master pattern is used to magnetize the transitions of the servo pattern on each of the product slave discs 16. As shown in FIG. 8, the preferred master disc 70 includes a magnetic layer 92 on top of an underlayer 94 and a substrate 96.

For print-through or magnetic proximity printing to be effective, the coercivity of the master disc 70 ($H_{cm}$) should be higher than the coercivity of the "slave" medium 38 ($H_{cs}$). Preferably the master disc coercivity is 1.2 to 1.5 times as great as the slave disc coercivity, such as $H_{cm} \geq 3,500$ Oersteds and $H_{cs} = 2,500$ Oersteds. A high coercivity on the slave medium 38 is desired because high coercivity leads to sharper transitions and higher attainable storage densities in the resulting disc drive 10. The even higher coercivity of the master medium 70 is necessary for the print-through process to be most effective while not destroying the magnetization recorded on the master medium 70.

Obtaining a high coercivity master medium 70 is easier because there is no magnetic noise requirements on the master medium 70. The master disc 70 can use a wide choice of substrate materials, including nickel-phosphored aluminum, silicon or plastic. The master medium 70 should also have a high product of remanent flux density and thickness $B_r t$. For instance, a $B_r t \geq 1.0$ Tesla·μin may be necessary to produce the preferred write fields. Preferably the master disc 70 has a $B_r t \geq 1.8$ Tesla·μin.

The magnetic pattern on the master disc 70 can be fabricated by one-of-a-kind master writer intended only for writing of the master disc 70. The one-of-a-kind master writer should be able to write the servo master pattern without any need for stitching. The servo master writer should also be able to provide a very high write field gradient, by the head flying very low and having a very small gap and a low throat height, and by the head having a high moment material. In this way, a very high intensity servo master pattern is written onto the master disc 70 with essentially conventional recording techniques. The preferred master disc 70 has a minimum transition spacing b of approximately b=40 μin (1000 Angstroms).

Figure 5:
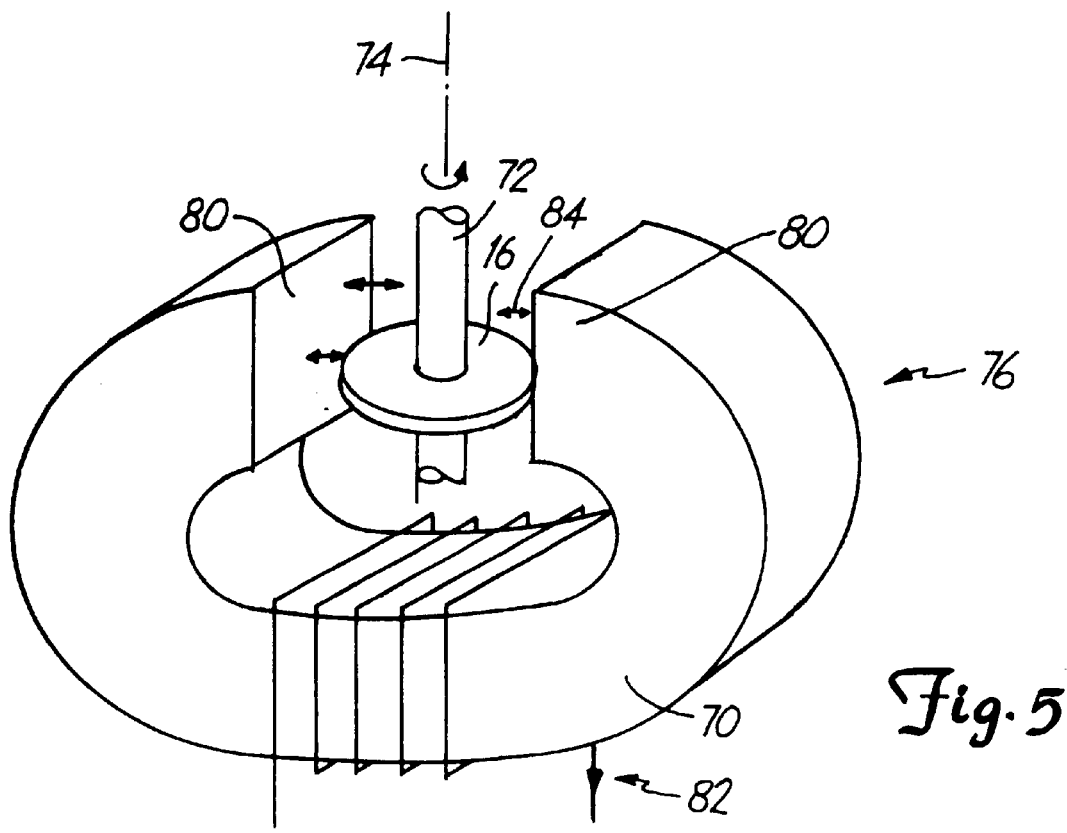
FIG. 5 is a perspective schematic view of a slave disc being demagnetized in a magnetic field.

After writing of the master disc 70, the magnetic proximity printing by the master disc 70 on a product "slave" disc 16 is preferably achieved as follows. First, the slave disc 16 is demagnetized using equipment as schematically shown in FIG. 5. The slave disc 16 is placed on a spindle 72 which rotates about axis 74. The rotating slave disc 16 is submersed in a large, powerful magnetic field 84 produced by electromagnet 76. Electromagnet 76 includes a large magnetic yoke 78 and pole pieces 80 which are magnetized with a magnetizing current through conductor 82. The pole pieces 80 and the yoke 78 of electromagnet 76 are made of a material with high magnetic permeability, high saturation magnetization, low remanence and low coercivity. For example, the material for pole pieces 80 and yoke 78 could be made of permalloy, mu-metal, or similar materials. Electromagnet 76 is oriented with respect to disc 16 such that the magnetic field 84 produced is in-plane relative to disc 16.

Figure 6:
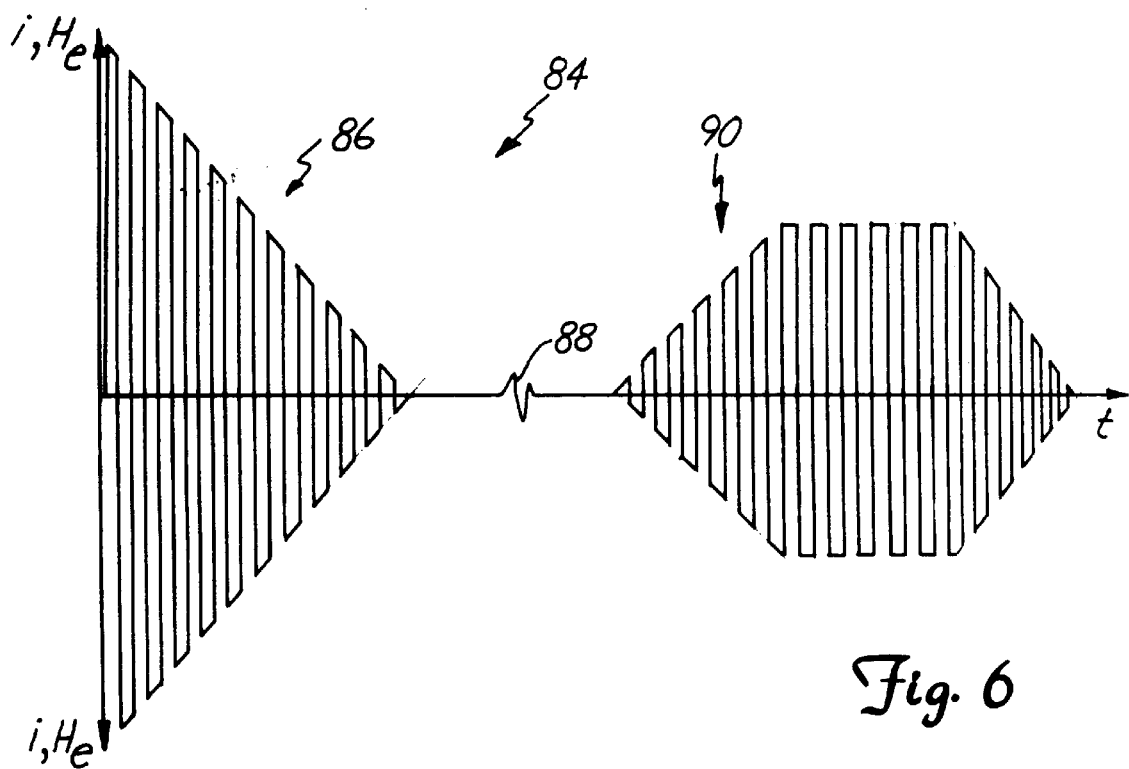
FIG. 6 is a graph of current versus time for the electromagnet of FIG. 5 during the magnetic print-through process.

The amount and direction of electric current through conductor 82 can be modulated as necessary for the desired timewise adjustment of electromagnet field 84. FIG. 6 represents the preferred current through conductor 82 as a function of time, and thus the magnitude of the preferred magnetic field 84 produced by electromagnet 76 as a function of time. During demagnetization 86, the current i and electromagnet field 84 $H_e$ start at a very high value. The initially high magnitude of the electromagnet field 84 $H_e$ should be higher than the coercivity of the slave medium 38 $H_{cs}$. The direction of the current and electromagnet field 84 is alternated at a frequency which is high compared to the frequency of rotation of the slave disc 16. The amplitude of the current and electromagnet field 84 is gradually reduced to zero.

This demagnetization process 86 renders the magnetic domains of the slave medium 38 in a relatively uniform non-aligned magnetization state so the magnetic domains can be commonly magnetized with a servo writing field of lesser strength than if demagnetization 86 had not been performed. For instance, disc drives 10 normally have a write field, $H_w$, which is about 3 times the coercivity of the medium 38 so that the write field will reliably overwrite or erase old data. The write field is localized in the magnetic medium 38 of the product disc 16 directly adjacent the magnetic head 28. To write a servo pattern into an ideally demagnetized slave medium 38, a localized write field which is only slightly greater than the coercivity of the magnetic layer 44 of slave disc 16 may be sufficient. The preferred localized write field for the present invention is approximately 1.3 times the slave coercivity ($H_w \geq 1.3 H_{cs}$).

Figure 7:
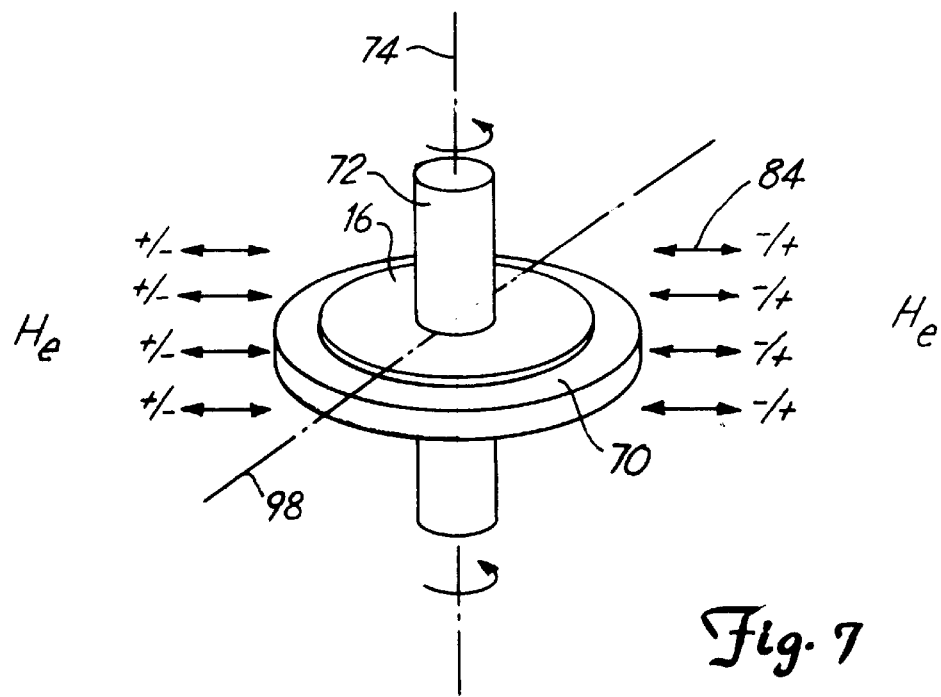
FIG. 7 is a perspective view of a slave disc and master disc in alignment on a spindle for placement in the magnetic assist field of FIG. 5.
Figure 8:
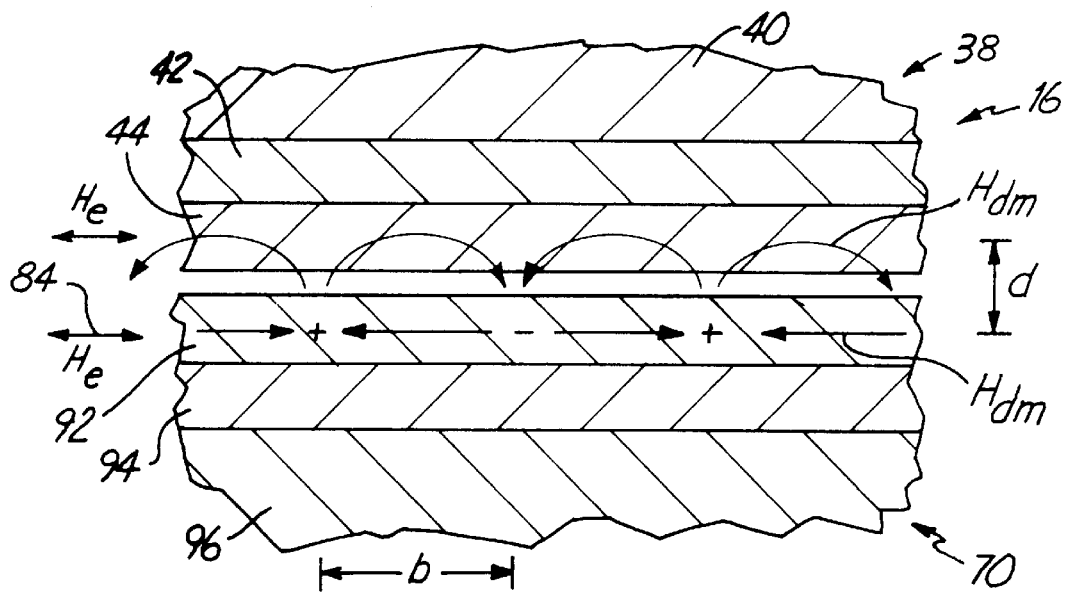
FIG. 8 is a greatly enlarged, cross-sectional view of a portion of the slave disc and master disc of FIG. 7 during print through, schematically showing magnetic flux.

After demagnetization 86, a master disc 70 is mounted on spindle 72 in close proximity to slave disc 16 as shown in FIGS. 7 and 8, such that the servo master patterns on master disc 70 are in alignment with the desired locations of servo patterns on slave disc 16. This alignment may occur by using a conventional contact mask aligning station.

The horizontal time axis in FIG. 6 is broken to indicate the alignment step 88 between the slave disc 16 and the master disc 70. After alignment 88, spindle 72 is rotated so master disc 70 and slave disc 16 rotate together relative to the magnetic field 90 produced by electromagnet 76. Electromagnet 76 is oriented with respect to the master/slave combination such that the magnetic field 90 produced is in-plane relative to medium 38. The large (i.e., nonlocalized) magnetic field 84 produced by electromagnet 76 assists in transferring the magnetic pattern of master disc 70 onto slave medium 38.

During servo-writing 90 (FIG. 6), the current i and electromagnet field 84 of electromagnet 76 $H_e$ preferably start at zero, gradually increase to a maximum value, and then gradually decrease to zero. The direction of the current i, and hence the direction of electromagnet field 84 $H_e$, is alternated at a frequency which is high compared to the frequency of rotation of the slave/master disc combination. For the preferred magnetic parameters of master medium 70 and slave medium 38 given previously, a maximum magnetic assist field 84 during servo-writing 90 of $H_e$=2780 Oersteds is appropriate.

The master disc 70 and slave disc 16 are shown in FIG. 7 as being the same shape, with the master disc 70 having a slightly greater diameter and a slightly greater thickness than the slave disc 16. However, workers skilled in the art will appreciate that there are no size, shape or thickness requirements for the master medium 70. In fact the master medium 70 can take on any shape provided that it bears a magnetic servo master pattern which will areally correspond to the desired servo pattern on the slave disc 16.

Because the proximity printing operation occurs in a manufacturing setting and without using an air bearing magnetic head 28, there are no tribology requirements for either the master disc 70 or the slave disc 16 at the time of print-through. It is not necessary for the overcoat 46 and the lubricant 48 to yet be applied to either the surface of the master disc 70 or the slave disc 16. Accordingly, master medium 70 and slave medium 38 are depicted in FIG. 8 without n overcoat layer 46 or a lubricant layer 48. The separation d between the magnetic layer 92 of the master medium 70 and the magnetic layer 44 of the slave disc 16 is dependent upon the smoothness of the respective surfaces and the flatness of the discs 16, 70. Workers skilled in the art will appreciate that, if print-through is performed prier to deposition of the overcoat layer 46 and lubricant layer 48, master medium 70 and slave medium 38 should be maintained in a non-corrosive environment throughout the print-through process. Alternatively, overcoat layers 46 and lubricant layers 48 may be used on both the master medium and the slave medium 38. A practically achievable separation d between the magnetic layer 92 of the master medium 70 and the magnetic layer 44 of the slave medium 38 is about d=4 $\mu$in (1000 Angstroms).

If the original magnetic transitions within the master medium 70 are very sharp, the sharpness of the magnetic transition will be affected by the electromagnet assist field 84. In the limit, for high values of the electromagnet assist field 84 relative to the coercivity of the master medium 70, a series of originally sharp transitions on the master medium 70 will change into an approximately sinusoidal magnetization pattern. In addition to being able to survive a large rotating field, the sinusoidal distribution in the master medium 70 also provides a larger stray field for writing into the slave medium 38. Accordingly, the preferred method of practicing the present invention involves use of a master medium 70 with sinusoidal magnetic transitions, particularly for servo bursts 62.

During the print-through operation, the electromagnet assist field 90 enhances the local magnetic field produced by the master medium 70. The peak writing field can be expressed as $H_w=H_e+H_{dm}(d)$, where $H_{dm}(d)$ is the demagnetizing field produced by the magnetic transitions in the master medium 70 at a separation height d away from the magnetic layer of the master medium 70 and centered between magnetic transitions. For the preferred values of $B_r t$=1.8 Tesla·$\mu$in, b=40 $\mu$in and d=4 $\mu$in given previously, $H_{dm}(d)$=527 Oersteds, so peak write field $H_w$=2780+527= about 3300 Oersteds. This provides the $H_w/H_{cs}$=3300/2500= 1.32 for writing the servo pattern into the demagnetized slave medium 38. When the direction of the electromagnet assist field 90 is reversed (i.e., against the direction of the demagnetizing field $H_{dm}(d)$), $H_w$=2780−527=about 2250 Oersteds=0.9 $H_{cs}$ (as given earlier, $H_{cs}$=2500 Oersteds). Accordingly, the electromagnet assist field 90 does not reverse magnetism of the magnetically aligned domains after they have been written, regardless of subsequent reversal of the direction of electromagnet assist field 90.

The sum of the rotating assist field 90 of electromagnet 76 and the maximum demagnetizing field of the master medium 70 must not exceed the coercivity of the master medium 70—otherwise the master servo pattern on the master medium 70 would be altered by the print-through process. With the preferred values given, the demagnetizing field within the master magnetic layer (i.e., at d=0) $H_{dm}$=720 Oersteds, so the write field within the master medium 70 does not exceed the master medium coercivity $H_{cm}$.

Rotation of the electromagnet assist field 84 relative to the slave disc 16 enhances the local magnetic field produced by the master medium 70. The magnetic transitions in the master medium 70 occur in the circumferential direction Θ. The peak writing field occurs in the slave medium 38 when the magnetic assist field 90 points in the same direction as the circumferential magnetic transitions from the master medium 70, i.e., along line 98 in FIG. 7 where the magnetic assist field 84 is tangential to the slave disc 16. Rotation of the electromagnet assist field 84 relative to the aligned slave/master combination assures that the direction of the electromagnet assist field 84 and the circumferential direction of the master transitions will align for all areas of the disc 16 because all areas of the disc 16 pass through line 98.

Figure 9:
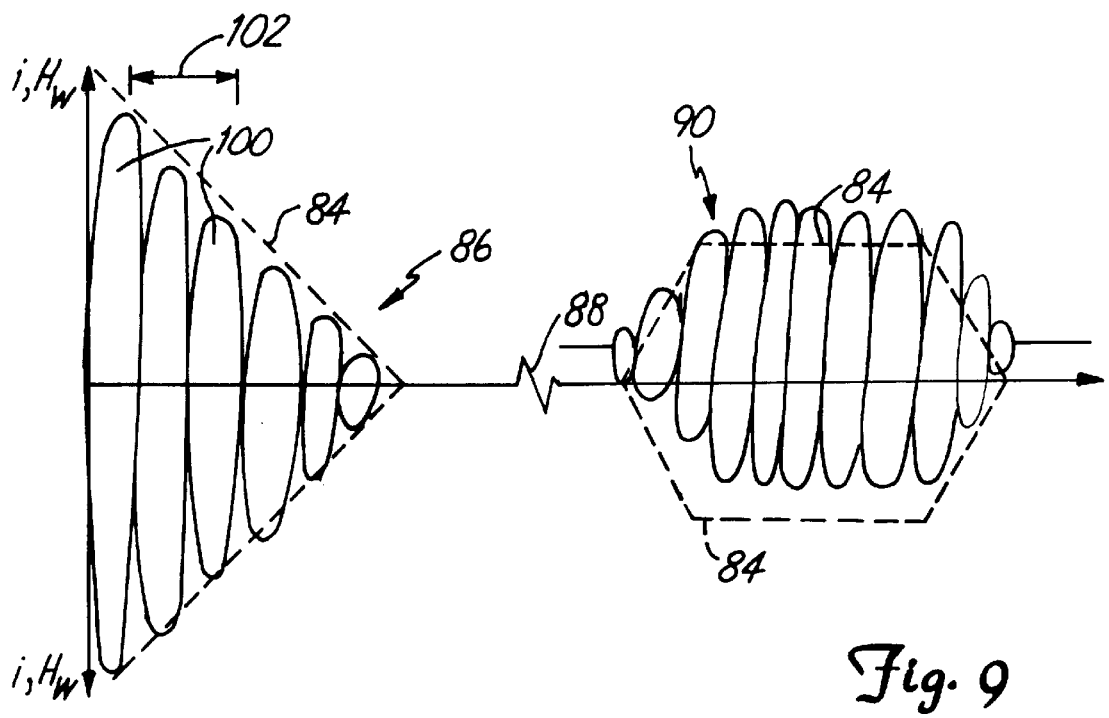
FIG. 9 is a graph of the circumferential component of the write field versus time during the magnetic print-through process.

FIG. 9 shows the write field in the circumferential direction $H_{wΘ}$ which is sensed by the slave medium 38 at a location centered between magnetized transitions on the magnetic master medium 70 (i.e., x=b/2). Superimposed with dashed line is the outline of the electromagnet assist field 84 from FIG. 6. For simplicity, the high frequency switching of the direction of current and electromagnet field has not been shown, but rather the sensed field is shown continuously in both the positive and the negative directions.

The write field in the circumferential direction is characterized by a number of large sinusoidal variations 100 in magnitude with a period 102. These sinusoidal variations 100 are due to the rotation of the master/slave disc combination (i.e., with polar coordinate orientation) within the stationary electromagnet field 84 (i.e., with Cartesian coordinate orientation). Period 102 reflects the rate of rotation of disc 16 relative to electromagnet field 84.

During demagnetization 86, the write field is equally centered about the horizontal axis in both+ and –directions. During servo-writing print-through 90, the write field is centered about a positive value, with the shift being caused by the demagnetizing field $H_{dm}(d)$ of the master disc 70. The write field is thus greater than the electromagnet assist field 84 in a positive direction, corresponding with a write field which exceeds the coercivity of the slave medium 38 sufficient to magnetically write on the slave medium 38. The magnitude of the write field is less than the electromagnet assist field 86 in the negative direction, corresponding with a write field which is less than the coercivity of the slave medium 38 sufficient to avoid reversal of the aligned magnetic domains.

The positive direction of the offset of the write field during servo-writing 90 is due to the positive direction of the demagnetizing field of the master disc 70. In locations where the master disc 70 is magnetized in the opposite direction, the write field during servo-writing will be offset in the negative direction. The servo-writing print through process thus magnetizes a servo-pattern into the product slave disc 16 having full transitions from magnetism in one direction to magnetism in the opposite direction, resulting in a strong position error signal.

Figure 10:
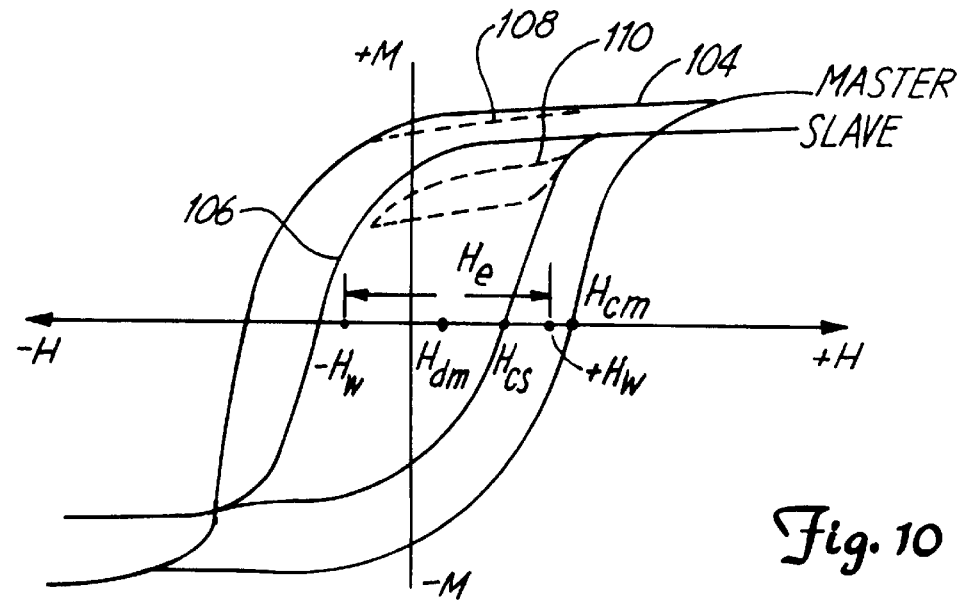
FIG. 10 shows a magnetization curve for the master medium superimposed with a magnetization curve for the slave medium during alignment between the maximum electromagnet field and the demagnetizing field of the master medium.

FIG. 10 shows a magnetization curve 104 for the master medium 70 superimposed with a magnetization curve 106 for the slave medium 38 during alignment between the maximum electromagnet assist field 84 and the demagnetizing field of the master medium 70. The dashed line 108 represents the magnetization path of the master medium 70 due to alternation of the direction of magnetism in the electromagnet field 84. The dashed line 110 represents the magnetization path of the slave medium 38 due to alternation of the direction of magnetism in the electromagnet field 84. The relationship between the demagnetization field, the electromagnet assist field 84 and the slave coercivity causes the slave medium 38 to take on a residual magnetization corresponding to the magnetization of the servo-master pattern. At the same time, the higher coercivity of the master medium 70 keeps the master medium 70 from losing magnetization due to the electromagnet field 84. Workers skilled in the art will appreciate that the magnetization curve 106 of the slave medium 38 and the magnetization curve 104 of the master medium 70 and the magnitude of the electromagnet assist field 84 must interact to achieve the beneficial results of the present invention.

Workers skilled in the art will recognize that there may be other feasible methods for aligning the electromagnet assist field 84 with the circumferential direction of the magnetic transitions on the slave disc 16. As an alternative embodiment, shown in FIG. 11, the master/slave disc combination may be placed between two electromagnets 112, 114 at 90° angles to each other. The first electromagnet 112 is driven with a current 90° out of phase with respect to the current driven through the second electromagnet 114. The direction of the magnetic assist field is in-plane relative to the master/slave combination. In this case, no physical rotation of the discs 16, 70 may be required, but the design of the electromagnets 112, 114 becomes more difficult.

As a second alternative embodiment, a middle ground could be chosen between the large, non-localized electromagnet field 84 described above and the highly localized, point magnetic filed of a traditional recording head. An electromagnet could be constructed with a linear gap extending immediately adjacent the master/slave combination from axis 74 (shown in FIG. 7) radially outward. The linear gap should be "ultrawide" (say, for example, 40,000 tracks wide), as compared to the about 1 track width of a traditional recording head. The magnetic assist field created by the ultrawide head should be highly concentrated at a distance from the electromagnet which roughly corresponds with the distance to the master/slave interface, running the entire radius of the slave disc 16. The direction of the magnetic assist field at the master/slave interface should be in-plane and circumferential. For instance, the pole tips of the ultrawide head could be approximately 1–5 mm apart, extending a full 2½ inch radius of the slave disc 16, with pairs of opposite pole tips arranged both above and below the master/slave interface(s). Having ultrawide heads both above and below the master/slave interface is helpful in concentrating the magnetic field created thereby closer to the master/slave interface. As compared to a distance of 100–200 Angstroms from the head poles to the magnetic medium in tradiation recording, the target magnetic layer of the slave disc in magnetic print-through printing is at least the thickness of the master disk away from one of the ultrawide heads, and at least the thickness of the slave disc away from the other of the ultrawide heads. The master/slave combination is rotated with respect to the linear magnetic assist field, so the linear magnetic assist field sweeps across the entire surface of the master/slave interface in one rotation of the master/slave combination. The linear magnetic assist field is used to magnetize all tracks 58 on the disc 16 equally and at the same time.

Figure 11:
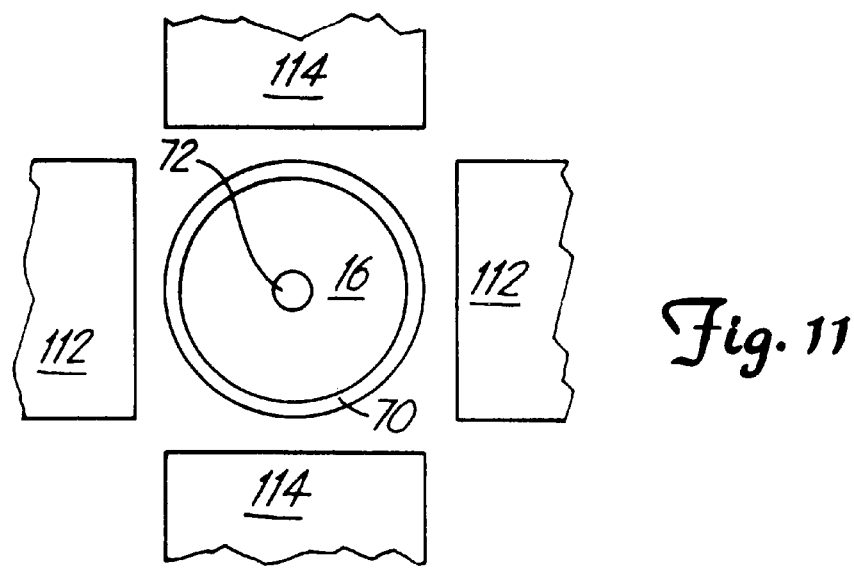
FIG. 11 shows an alternative embodiment of the electromagnet of FIG. 5.

In contrast to the magnetic assist field 84 produced in FIGS. 5 and 11, the magnetic assist field of the ultrawide head configuration maintains circumferential alignment with respect to the master/slave combination. While this servo-writing process may require more rotations of the master/slave combination as compared to the large magnetic assist field 84 produced by the electromagnet of FIGS. 5 or 11, servo-writing is still achieved much more quickly than with traditional methods.

As a third alternative embodiment, a toroidal (doughnut) shaped electromagnet/conductor combination could be constructed. The toroidal combination should be constructed to produce an alternatable magnetic field which is circumferentially directed about axis 74. The master/disc combination may then be positioned within this electromagnet during the print-through process. With the toroidal combination, the print-through magnetic assist field is circumferentially oriented at all locations on the disc. The aligned magnetic domains, which can be theoretically viewed as vectors, are thus commonly aligned or oriented in the circumferential direction without a radial component, similar in orientation to the direction of the magnetic domains produced in traditional servo-writing. Such an arrangement would be more complicated in terms of mechanical construction of the electromagnet for the assist field, but would tend to reduce any radial component to the direction of aligned magnetic domains.

Workers skilled in the art will appreciate that the transitions of the master medium 70 may differ significantly, both in sharpness and in areal extent, from the magnetic transitions 56 which are subsequently recorded on the slave medium 38. For instance, a decrease in definition of the image transferred by the proximity printing can be compensated for by adjusting the areal overlap between bursts on the master medium 70. With reference to FIG. 4, good definition along a track 58 of the slave disc 16 is not necessary as long as the magnetization in the recording medium 38 gets close to +/− Br half way between transitions 56. In reading the slave servo pattern and detecting areas of servo bursts 62, a sinusoidal output wave shape may actually be preferable to a sequence of spikes separated by long stretches of base line.

The present print-through process has been described with reference to only one side of a disc 16. Workers skilled in the art will appreciate that one-sided discs may be used in the disc drive product, or that two one-sided discs may be joined back-to-back to form a two-sided disc in the disc drive product. In the alternative, two master discs 70 can be used in the print through process, each aligned against a respective side of the product disc 16. The magnetic flux patterns within the magnetic layers 44, underlayers 42, and substrate 40 and the relatively large distance between magnetic layers 44 on the two sides of the product disc 16 prevent any measurable magnetic transfer from top side to bottom side through the product disc 16.

Figure 12:
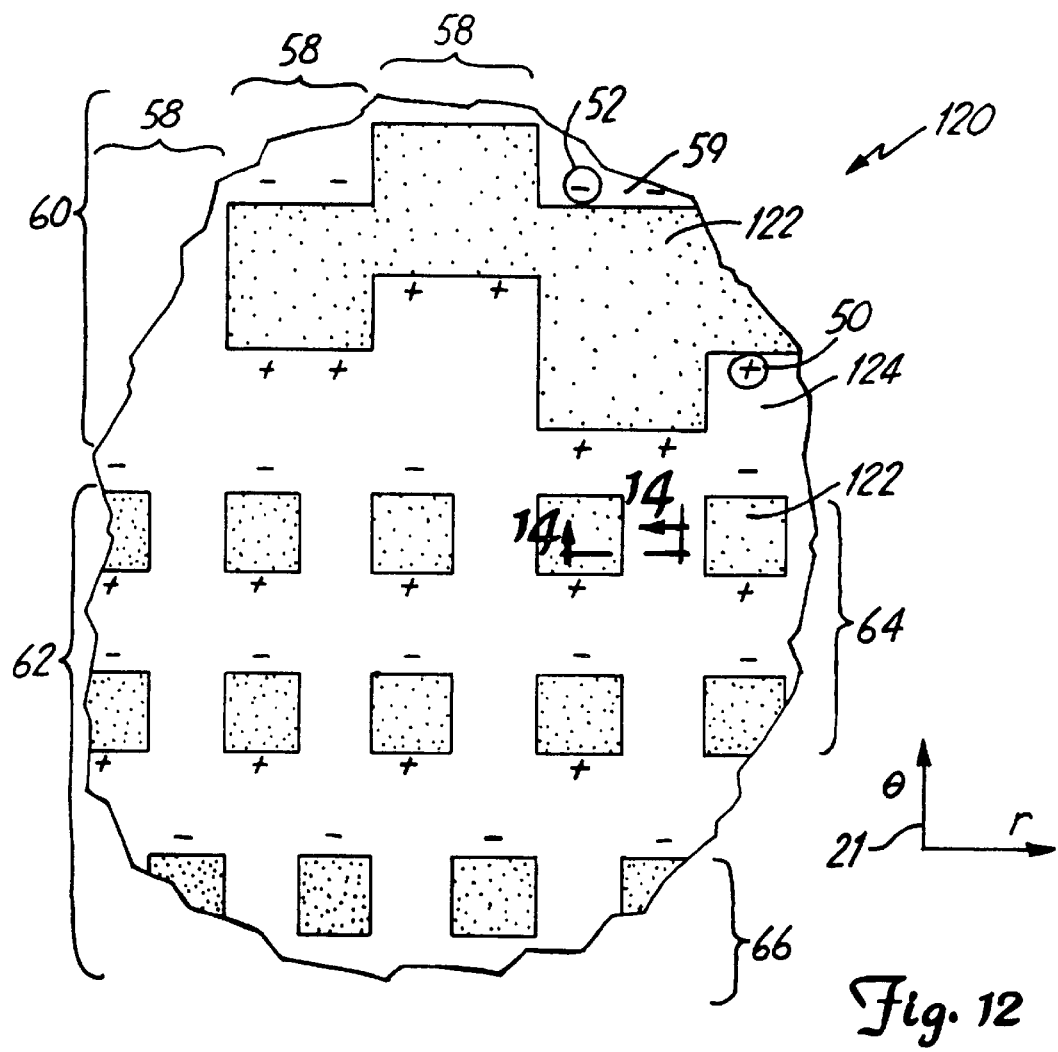
FIG. 12 is a greatly enlarged top plan view of the magnetic medium of an alternative embodiment of the present invention, schematically showing magnetic flux.

An alternative disc 120 with simplified writing of the servo pattern is schematically shown with reference to FIG. 12. In FIG. 12, portions 122 of the recording medium 38 do not support a magnetic signal, i.e., the magnetic domains of portions 122 are not present or otherwise are not capable of magnetic alignment regardless of any processing by an external magnetic field. The boundaries of non-magnetic portions 122 are defined during fabrication of disc 16 and before any servo-writing takes place. The remaining portions 124 of the recording medium have a signal magnetically recorded thereon, as indicated by + and − magnetization signs 50, 52. In magnetic signal portions 124, due to the application during servo-writing of a magnetic field, the magnetic domains of the magnetic layer 44 are all oriented in the same direction. Because all magnetic signal portions 124 bear a common signal in the same direction, there are no transitions within each signal portions 124 within a track 58. The transitions which can be sensed are between the aligned magnetic signal portions 124 and the non-magnetic portions 122. magnetic signal portions 124 are in a pattern which represents both gray code information 60 and servo bursts 62. Workers skilled in the art will see that the alternative servo-burst pattern shown in FIG. 4a could similarly be readily modified by the present invention to consist of aligned magnetic signal portions and the non-magnetic portions.

In FIG. 12, product disc 120 has non-magnetic portions 122 which are essentially "islands" in a "sea" of commonly recorded magnetic signal portions 124. FIG. 13 represents an alternative embodiment of FIG. 12. In FIG. 13, product disc 128 has magnetic portions 124 which are "islands" in a "sea" of non-magnetic portions 122. The transitions which can be sensed are again between the aligned magnetic signal portions 124 and the non-magnetic portions 122.

Unlike traditional servo patterns, magnetic signal portions 124 of the servo patterns of FIGS. 12 and 13 are all aligned in the same, single direction. In reading the servo-patterns of FIGS. 12 and 13, the transitions sensed by the read head 28 are not between opposite directions of magnetic alignment. Rather, the sensed transitions are between the positive magnetic field provided over magnetic signal portions 124 and the absence of magnetic field or the weaker magnetic field signal when flying over a non-magnetic portion 122. This provides a position error signal of the servo patterns which is theoretically half that of a traditional servo pattern. Workers skilled in the art will appreciate that the data portions (not shown) of tracks 58, which have no non-magnetic portions 122, are written during use of the disc drive by traditional methods including reversing the direction of magnetization to create full magnetic transitions.

Centering over the track 58 is accomplished by comparing portions of the signal read from the servo bursts 62. If the magnetic head 28 is centered over the track 58, the signal read from the inside transitions 64 will be equal to the signal read from the outside transitions 66. If the magnetic head 28 is toward the inside of the track 58, the signal from the inside transitions 64 will be stronger than the signal from the outside transitions 66. If the magnetic head 28 is toward the outside of the track 58, the signal from the outside transitions 66 will be stronger. By comparing portions of the servo burst 62 signal, the disc drive 10 can iteratively adjust the head 28 location until a zeroed position error signal is returned from the servo bursts 62, indicating that the head 28 is properly centered with respect to the track 58.

The beneficial result of the magnetic media of FIGS. 12 and 13 comes due to simplification of the servo-writing process. With the boundaries of non-magnetic portions 122 pre-defined, placing the magnetic pattern on servo patterns becomes much easier, less time-consuming, and less expensive. Because all of the magnetic domains which bear a signal are aligned in a single direction, they can be commonly written by an external magnetic field which is areally much larger than the highly localized magnetic field used to record traditional servo patterns and data on the disc 16. For instance, the servo patterns of FIG. 12 can be written with a single pass of a magnetic head 28 over a track 58, rather than two passes per track 58 and "stitching" used during traditional servo-writing.

The servo patterns of FIGS. 12 and 13 can also be written by a specialized ultrawide servo writer head that produces a linear magnetic field in the radial direction, and by sweeping the linear magnetic field over the entire surface of disc 16 in a single pass. The servo patterns of FIGS. 12 and 13 can alternatively be written by submersing the disc 16 into a large rotating or circumferential magnetic field 84, similar to that described earlier with reference to FIGS. 5 and 11.

Workers skilled in the art will recognize that the present invention could be used for the servo burst 62 portion of the servo-pattern information, while leaving the gray code information 60 recorded by traditional methods. Provided the centering servo burst information 62 was written in accordance with this invention, gray code information 60 could be sequentially written by the magnetic head 28 of the disc drive system 10 at a later time, without any servo-writer equipment present. Writing of the gray code information 60 would merely involve a traversal of the magnetic head 28 outward on the disc 16 to write indexing information to each of tracks 58 as defined by the servo bursts 62. The outward traversal of magnetic head 28 should be performed slowly and carefully to verify that complete gray code information 60 is provided to each of the tracks 58 without skipping any tracks 58.

Numerous methods are contemplated for creating the pattern of non-magnetic portions 122 on the magnetic medium 38. For instance, as shown in FIG. 14, the magnetic layer 44 may be removed from non-magnetic portions 122 prior to deposition of the overcoat layer 46. The overcoat 46 and lubricant layer 48 extend over both magnetic portions 124 and non-magnetic portions 122, and help with smoothing the surface for flyability and for providing corrosion protection. Because the magnetic layer 44 is absent from portion 122, portion 122 does not support a magnetic charge. Magnetic flux 54 is sensed by the read transducer only when it is flying over magnetically charged portion 124.

One method to remove the magnetic medium from non-magnetic portions 122 is with a photolithographic etching process during fabrication of the disc 16. Photolithographic etching processes are well known in the semi-conductor art, and will only be summarized here. After deposition of magnetic layer 44 but prior to deposition of the overcoat 46, a photoresist mask is applied over the magnetic layer 44. The process linewidth that is required for the photolithographic etching process is approximately equal to the flux transition to flux transition spacing within the servo-pattern, typically about one micron or more, which is within state of the art linewidth resolution capabilities. The photoresist mask has a pattern which covers all the magnetic portions 124 of the servo-pattern, but leaves the non-magnetic portions 122 unprotected. The photoresist mask should also cover and protect the entirety of the data portions on the disc 16. An acid or other chemical etching step may then be used to remove portions of the magnetic layer 44 which are not protected by the photoresist mask. After etching, the photoresist mask may be dissolved or otherwise completely removed. Further fabrication of the disc 16, including deposition of the overcoat 46 and lubricant layers 48 over the surface of the disc 16, may then be completed.

Workers skilled in the art will recognize that alignment of the disc axis with the photolithographic pattern is critical to the success of this type of servo-writing process. The servo-pattern information must be precisely located in the radial direction to assure that the servo-pattern information is concentric with the rotation of the disc 16 relative to the magnetic read head 28.

An alternative method to remove the magnetic medium in non-magnetic portions 122 is to place a photolithographic lift-off pattern on the underlayer 42 of disc 16 prior to sputtering of the magnetic layer 44. The lift-off pattern corresponds with the design and location of the non-magnetic portions 122. After the magnetic layer 44 is applied over the entire surface of the disc 16, the lift-off pattern and overlying magnetic layer 44 may be lifted off in the desired areas 122.

Another alternative method to remove the magnetic medium in non-magnetic portion 122 is to use ion milling. The ion milling process is known in other arts as a way to selectively and accurately remove thin layers of material, and will not be specifically described here. The ion milling process must be accurately controlled to assure that magnetic layer 44 is removed only in the specific pattern of non-magnetic portions 122.

Figure 15:
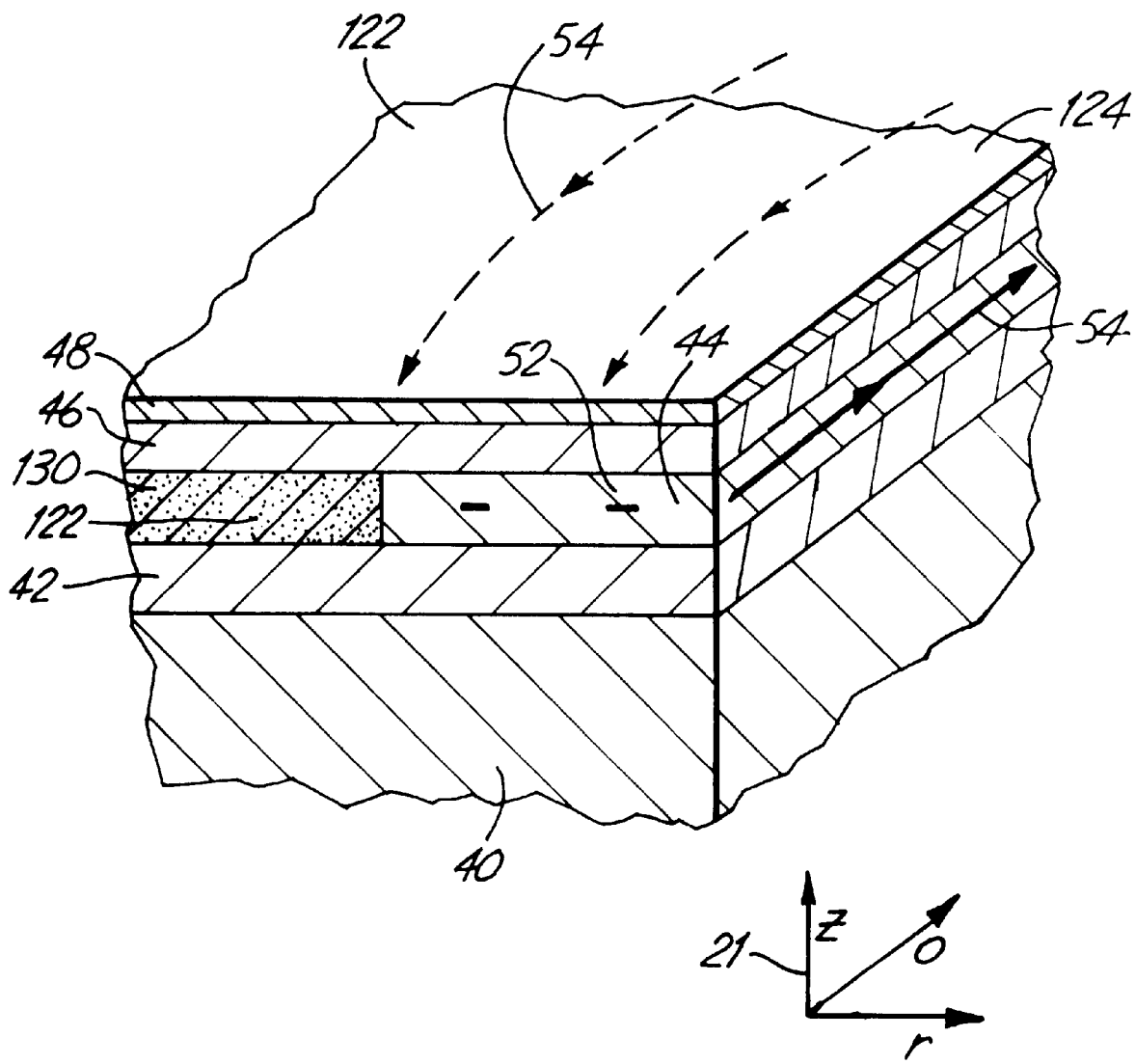
FIG. 15 is a cross-sectional view of the magnetic medium of either of FIGS. 12 or 13, alternative to FIG. 14.

Other alternative methods to create non-magnetic portions 122 include placing material 130 which is magnetically non-responsive within the magnetic layer 44. This is shown with reference to FIG. 15, wherein non-magnetic portions 122 exist within magnetic layer 44. In either the etching or lift-off processes, the surface irregularities created as described with reference to FIG. 14 could be filled with some hard material 130 such as tantalum. Filling the non-magnetic portions 122 to the same overall height as magnetic portions 124 is helpful in improving flyability and tribology of the disc 16.

Another alternative method to create the non-magnetic areas is through an ion implantation or other process that destroys or alters the magnetic properties of the magnetic layer 44. The magnetic altering process may be accomplished with a photoresist mask overlying and protecting the magnetic portions of the magnetic layer 44. With ion implantation for instance, ions of a "kill" material that disrupts the crystallographic structure of the cobalt-based magnetic layer 44 may be implanted to create the non-magnetic portions 122 at the locations which are not covered by the photoresist mask. Various other types of processes can alternatively be used to reduce the magnetism of the magnetic layer 44 in locations corresponding to non-magnetic portions 122.

Although the present invention has been described with reference to preferred embodiments, workers skilled in the art will recognize that changes may be made in form and detail without departing from the spirit and scope of the invention.

What is claimed is:

1. A method of creating a magnetic disc with a magnetic servo pattern thereon, comprising the steps of:

aligning a magnetic disc immediately adjacent a servowriter medium, the servowriter medium having a higher coercivity than the magnetic disc, the servowriter medium having a servo-master pattern magnetically stored thereon which defines a plurality of concentric tracks;

applying a magnetic assist field to the aligned servowriter medium and magnetic disc, the magnetic assist field having a substantially equal magnitude at all tracks on the aligned servowriter medium and magnetic disc; and rotating the aligned servowriter medium and magnetic disc relative to the magnetic assist field.

2. The method of claim 1, further comprising the step of varying the magnitude of the magnetic assist field while applying the magnetic assist field to the aligned servowriter medium and magnetic disc.

3. The method of claim 2, further comprising the step of alternating the direction of the magnetic assist field.

4. The method of claim 2, further comprising the step of:

writing the servo-master pattern onto the servowriter medium.

5. The method of claim 1, wherein the servo-master pattern comprises a plurality of servo bursts with sinusoidal magnetic transitions.

6. The method of claim 2, further comprising the step demagnetizing the magnetic disc prior to the aligning step.

7. The method of claim 6, wherein the demagnetizing step is achieved by applying a demagnetizing field to the magnetic disc, the demagnetizing field having a substantially equal magnitude across an entire radius on the magnetic disc at any given time during demagnetizing, the demagnetizing field being in-plane and rotated relative to the magnetic disc.

8. The method of claim 7, further comprising the step of varying the magnitude of the demagnetizing field during demagnetizing.

9. The method of claim 1, wherein the servowriter medium is a magnetic thin film disc.

10. The method of claim 9, wherein the servowriter medium has an exterior layer of magnetic material without an overcoat.

11. The method of claim 1, wherein the servo-master pattern includes a plurality of servo patterns circumferentially spaced in each of the tracks, each of the servo patterns including a radial position address for its track and a servo burst for centering a magnetic transducer over the track, each of the servo bursts including transitions between a plurality of inner locations and a plurality of outer locations within the track.

12. The method of claim 2, further comprising the steps of:

separating the servowriter medium from the magnetic disc;

after the separating step, depositing an overcoat over the magnetic disc; and depositing a lubricant layer over the overcoat.

13. The method of claim 1, wherein the magnetic disc has a substantially planar magnetic layer, and wherein the magnetic assist field is directed substantially in-plane relative to the magnetic layer.

14. The method of claim 1, wherein the magnetic assist field has a field strength greater than the coercivity of the magnetic disc and less than the coercivity of the servowriter medium.

15. The method of claim 1, wherein the magnetic assist field has a substantially equal magnitude at all locations on the aligned servowriter medium and magnetic disc.

16. The method of claim 1, wherein the magnetic assist field is held constant in direction and magnitude during the rotating step.

17. A method of creating a magnetic servo pattern on a magnetic disc, comprising the steps of:

aligning a magnetic disc immediately adjacent a servowriter medium, the servowriter medium having a higher coercivity than the magnetic disc, the servowriter medium having a servo-master pattern magnetically stored thereon which defines a plurality of concentric tracks;

applying a magnetic assist field to the aligned servowriter medium and magnetic disc; and varying the magnitude of the magnetic assist field while applying the magnetic assist field to the aligned servowriter medium and magnetic disc to transfer a servo pattern onto the magnetic disc.

18. The method of claim 17, wherein the servo-master pattern comprises a plurality of servo bursts with sinusoidal magnetic transitions.

19. The method of claim 17, further comprising the step of:

demagnetizing the magnetic disc prior to the aligning step.

20. The method of claim 19, wherein the demagnetizing step is achieved by applying a demagnetizing field to the magnetic disc, the demagnetizing field having a substantially equal magnitude across an entire radius on the magnetic disc at any given time during demagnetizing, the demagnetizing field being in-plane and rotated relative to the magnetic disc.

21. The method of claim 20, further comprising the step of varying the magnitude of the demagnetizing field during demagnetizing.

22. The method of claim 17, wherein the servowriter medium is a magnetic thin film disc.

23. The method of claim 22, wherein the servowriter medium has an exterior layer of magnetic material without an overcoat.

24. The method of claim 17, wherein the servo-master pattern includes a plurality of servo patterns circumferentially spaced in each of the tracks, each of the servo patterns including a radial position address for its track and a servo burst for centering a magnetic transducer over the track, each of the servo bursts including transitions between a plurality of inner locations and a plurality of outer locations within the track.

25. The method of claim 17, wherein the magnetic disc has a substantially planar magnetic layer, and wherein the magnetic assist field is directed substantially in-plane relative to the magnetic layer.

26. The method of claim 17, wherein the magnetic assist field has a field strength greater than the coercivity of the magnetic disc and less than the coercivity of the servowriter medium.

27. The method of claim 17, wherein the magnetic assist field has a substantially equal magnitude at all locations on the aligned servowriter medium and magnetic disc.

28. A method of creating a magnetic servo pattern on a magnetic disc, comprising the steps of:

aligning a magnetic disc immediately adjacent a servowriter medium, the servowriter medium having a higher coercivity than the magnetic disc, the servowriter medium having a servo-master pattern magnetically stored thereon which defines a plurality of concentric tracks;

applying a magnetic assist field to the aligned servowriter medium and magnetic disc;

varying the magnitude of the magnetic assist field while applying the magnetic assist field to the aligned servowriter medium and magnetic disc; and alternating the direction of the magnetic assist field while applying the magnetic assist field to the aligned servowriter medium and magnetic disc to transfer a servo pattern onto the magnetic disc.

29. A method of creating a magnetic servo pattern on a magnetic disc, comprising the steps of:

writing a servo-master pattern onto a servowriter medium, the servo-master pattern defining a plurality of concentric tracks and comprising a plurality of servo bursts with sinusoidal magnetic transitions;

aligning a magnetic disc immediately adjacent the servowriter medium, the servowriter medium having a higher coercivity than the magnetic disc;

applying a magnetic assist field to the aligned servowriter medium and magnetic disc; and varying the magnitude of the magnetic assist field while applying the magnetic assist field to the aligned servowriter medium and magnetic disc to transfer a servo pattern onto the magnetic disc.

30. A method of creating a magnetic disc having a magnetic servo pattern thereon, comprising the steps of:

aligning a magnetic disc immediately adjacent a servowriter medium, the servowriter medium having a higher coercivity than the magnetic disc, the servowriter medium having a servo-master pattern magnetically stored thereon which defines a plurality of concentric tracks;

applying a magnetic assist field to the aligned servowriter medium and magnetic disc to transfer a servo pattern onto the magnetic disc;

varying the magnitude of the magnetic assist field while applying the magnetic assist field to the aligned servowriter medium and magnetic disc to transfer a servo pattern onto the magnetic disc;

separating the servowriter medium from the magnetic disc;

after the separating step, depositing an overcoat over the magnetic disc; and depositing a lubricant layer over the overcoat.

* * * * *

UNITED STATES PATENT AND TRADEMARK OFFICE
CERTIFICATE OF CORRECTION

PATENT NO. : 5,991,104
DATED : NOVEMBER 23, 1999
INVENTOR(S) :
PETER I. BONYHARD

It is certified that error appears in the above-identified patent and that said Letters Patent is hereby corrected as shown below:

Title Page, [56] References Cited, U.S. PATENT DOCUMENTS, insert -- 3,846,829   11/5/74   Lin, 360/46 --

Col. 9, line 52, delete "prier", insert -- prior --

Col. 16, line 38, after "step", insert -- of: --

Signed and Sealed this

Twenty-seventh Day of February, 2001

Attest:

NICHOLAS P. GODICI

Attesting Officer        Acting Director of the United States Patent and Trademark Office